United States Patent
Rapp et al.

(10) Patent No.: US 11,212,393 B2
(45) Date of Patent: *Dec. 28, 2021

(54) REMOTE ACCESS CONTROL

(71) Applicant: Amazon Technologies, Inc., Seattle, WA (US)

(72) Inventors: Ryan Christopher Rapp, Seattle, WA (US); Ricardo Jose Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,097

(22) Filed: Sep. 27, 2019

(65) Prior Publication Data

US 2020/0028971 A1    Jan. 23, 2020

Related U.S. Application Data

(63) Continuation of application No. 16/120,902, filed on Sep. 4, 2018, now Pat. No. 10,447,864, which is a continuation of application No. 15/631,204, filed on Jun. 23, 2017, now abandoned, which is a continuation of application No. 14/979,935, filed on Dec. 28, 2015, now Pat. No. 9,691,199.

(51) Int. Cl.
| | |
|---|---|
| *H04M 11/02* | (2006.01) |
| *H04M 3/42* | (2006.01) |
| *G07C 9/33* | (2020.01) |
| *G07C 9/38* | (2020.01) |

(52) U.S. Cl.
CPC ............. *H04M 11/025* (2013.01); *G07C 9/33* (2020.01); *G07C 9/38* (2020.01); *H04M 3/42042* (2013.01); *H04M 3/42068* (2013.01); *H04M 2201/39* (2013.01); *H04M 2201/40* (2013.01)

(58) Field of Classification Search
CPC ........ H04M 3/16; H04M 1/60; H04M 11/025; H04M 1/0291; E05F 15/00; G08B 25/008; B60R 2325/205; B60R 25/00; B60R 25/102; B60R 25/305; G07C 2209/02; G07C 2209/14; G07C 9/00158
USPC ......... 379/88.01, 88.02, 88.04, 88.08, 88.11, 379/88.13, 88.16, 88.18, 88.19, 88.2, 379/88.21, 88.25, 88.27, 167.01, 167.02, 379/167.05, 167.06, 167.07, 167.08, 379/167.12, 167.14, 167.15, 168
See application file for complete search history.

(56) References Cited

U.S. PATENT DOCUMENTS 8,406,745 B1 *   3/2013   Upadhyay ............. H04L 51/066
                                                                    455/413
9,425,981 B2 *   8/2016   Foster .................. H04M 11/025
(Continued)

*Primary Examiner* — Binh Kien Tieu
(74) *Attorney, Agent, or Firm* — Pierce Atwood LLP

(57) ABSTRACT

A system that allows a user to access a secured area by confirming location of the user near the secured area and receipt of an access word by the system. A user in possession of a mobile device may be detected at the entrance to a secured location. The system can select a question asking for a passcode corresponding to certain access to the secured location. The question can be spoken to a user through a loudspeaker at the secured location. The user's spoken response can be processed by the system, for example using keyword spotting, to determine if the proper access word is included. If it is, the system can grant access to the secured area.

18 Claims, 10 Drawing Sheets

(56) References Cited

U.S. PATENT DOCUMENTS

| | | | | |
|---|---|---|---|---|
| 9,571,661 | B2* | 2/2017 | Marsh | H04M 11/02 |
| 9,691,199 | B1* | 6/2017 | Rapp | G10L 17/24 |
| 10,447,864 | B1* | 10/2019 | Rapp | G07C 9/38 |
| 2007/0055517 | A1* | 3/2007 | Spector | G06F 21/32 |
| | | | | 704/246 |
| 2008/0129821 | A1* | 6/2008 | Howarter | H04N 7/181 |
| | | | | 348/143 |
| 2010/0128931 | A1* | 5/2010 | Bongard | G07B 15/00 |
| | | | | 382/105 |
| 2012/0249290 | A1* | 10/2012 | Marsh | H04M 11/02 |
| | | | | 340/5.7 |
| 2013/0017812 | A1* | 1/2013 | Foster | H04N 7/186 |
| | | | | 455/417 |
| 2013/0132091 | A1* | 5/2013 | Skerpac | G06F 21/32 |
| | | | | 704/273 |
| 2013/0214899 | A1* | 8/2013 | Herscovitch | G05B 1/01 |
| | | | | 340/5.53 |
| 2014/0002236 | A1* | 1/2014 | Pineau | H04W 12/06 |
| | | | | 340/5.6 |
| 2015/0149178 | A1* | 5/2015 | Kim | G10L 13/10 |
| | | | | 704/260 |
| 2015/0347910 | A1* | 12/2015 | Fadell | G05B 19/042 |
| | | | | 706/46 |
| 2016/0308859 | A1* | 10/2016 | Barry | G06K 9/2036 |

* cited by examiner

REMOTE ACCESS CONTROL

CROSS-REFERENCE TO RELATED APPLICATION DATA

This application is a continuation of U.S. patent application Ser. No. 16/120,902, "entitled "Remote Access Control," filed on Sep. 4, 2018, in the names of Ryan Christopher Rapp, et al., which claims priority to U.S. patent application Ser. No. 15/631,204, entitled "Remote Access Control," filed on Jun. 23, 2017, in the names of Ryan Christopher Rapp, et al., which claims priority to U.S. patent application Ser. No. 14/979,935, entitled "Remote Access Control," filed on Dec. 28, 2015, in the names of Ryan Christopher Rapp, et al. and issued as U.S. Pat. No. 9,691,199 on Jun. 27, 2017. The above patent applications are herein incorporated by reference in their entireties.

BACKGROUND

Call boxes are a feature in some apartment buildings that allow individuals to gain access to the apartment building. A resident of an apartment in the building can "buzz-in" a guest or delivery person to the lobby without going to the building's front door. Discussed herein are technical solutions to replace or improve, among other things, existing call box systems in apartment buildings.

DETAILED DESCRIPTION

Figure 1:
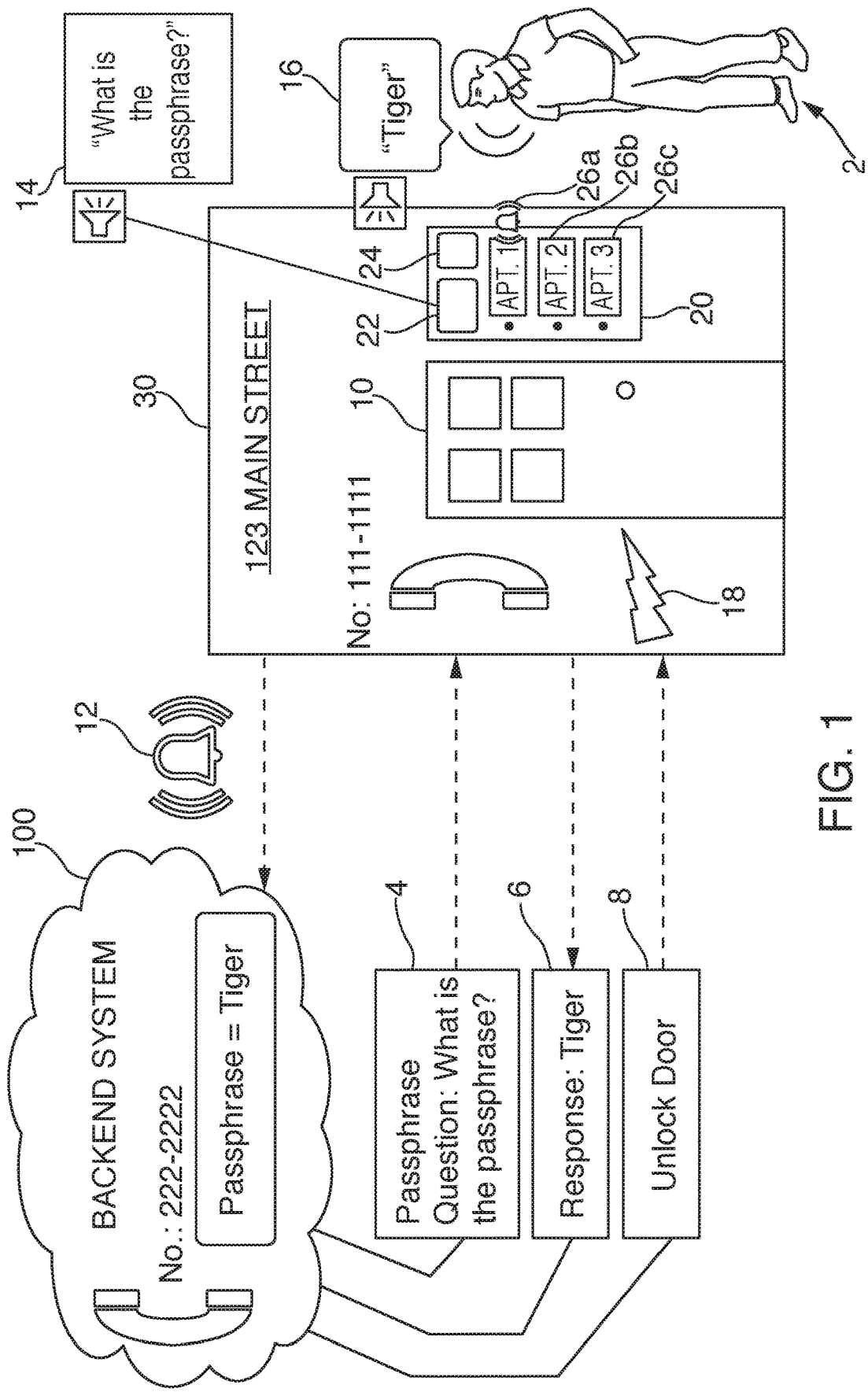
FIG. 1 is an illustrative diagram of a system for communicating with a call box to provide access to a residence or other secured area, in accordance with various embodiments.

The present disclosure, as set forth below, is generally directed to various embodiments of methods and devices for providing access to a residence or other secured area using a backend system. A residence, as described herein, may correspond to any location with which an individual, or individuals, may desire to enter, such as an apartment building, dorm, a housing unit, multi-tenant dwelling, or a residential house. In some embodiments, a residence may also correspond to an office building, parking structure, or any other building with which one or more individuals may seek to gain access to. A secured area, as described herein, may correspond to any location with which an individual, or individuals, may seek to gain access to, such as an automobile, an office, a secured facility or room, or any other type of secured area.

Apartment buildings, for example, typically have a call box located proximate to a main door for the building. A first and/or last name and apartment number of each resident of the apartment building may be listed on the call box. Next to each apartment resident's listing may be a button that, when pressed, causes the call box to call a telephone number associated with that apartment. Residents may, provide a specific telephone number to be used for the callbox, which is programmed into the call box by the apartment building's management. For instance, a resident that provides their cellular telephone number for use with the call box would receive telephone calls on their cellular telephone when their apartment's button on the call box is pressed. However, instead of their cellular telephone number, a resident may alternatively use a dedicated home phone telephone number, a work telephone number, or any other suitable telephone number.

The apartment resident may allow the individual to enter their apartment building by pressing a specific number on their touch-tone keypad (e.g., pressing the number "9"). In response, an audio tone corresponding to the specific number may be transmitted to the call box. The call box then outputs that audio tone through its speaker, which may cause the main door to become unlocked. For example, pressing the number "9" on the apartment resident's phone may send an audio tone to the call box that of a particular frequency that, when played, causes the main door to unlock.

In some embodiments, an apartment resident may have a user account on a backend system having a telephone number assigned to it. The resident may, alternatively, provide user account's telephone number to building management so that it may be used for the call box. The backend system, for example, may answer any incoming calls originating from the call box. Therefore, when the apartment resident's call box button is pressed by an individual, the call box may call the user account's phone number and the backend system may communicate with the individual using the call box.

In some embodiments, the apartment resident may set a passphrase or access word that, if spoken into the call box and received by the backend system, causes the backend system to generate an audible tone that unlocks the apartment building's main door. Furthermore, in some embodiments, an access question whose answer is the passphrase or access word may be generated in response to the user programming the access word. If the apartment resident's call box button is pressed, the backend system may send the access question to the call box, which plays the access question using the call box's speakers. The individual that pressed the call box button may then respond to the access question by speaking an answer to the access question into the call box's microphone. The backend system may receive the answer and determines whether or not the answer is, or includes, the passphrase or access word. If so, the backend system may, for example, generate the audible tone that causes the main door to unlock, and may send the audible tone to the call box.

FIG. 1 is an illustrative diagram of a system for communicating with a call box to provide access to a residence or other secured, in accordance with various embodiments. In some embodiments, an individual 2 may seek to gain access to a residence 30, such as an apartment building or multi-tenant dwelling. However, persons of ordinary skill in the art will recognize that residence 30 may alternatively correspond to a single family home, an office building, an automobile or other means of transportation, or any area that one or more individuals may seek to gain access to. Individuals may enter and/or exit residence 30 using a door 10.

Proximate door 10, in some embodiments, may be call box 20, which may include one or more speakers 22, one or more microphones 24, and one or more buttons 26a-c corresponding to various apartment within residence 30. For example, call box 20 may include a first call box button 26a corresponding to "Apt. 1," a second call box button 26b corresponding to "Apt. 2," and a third call box button 26c corresponding to "Apt. 3." Individual 2 may press one of buttons 26a-c to call that apartment's resident to be allowed access to residence 30. Each of apartment buttons 26a-c may have a telephone number associated with it that is programmed into call box 20 by building management for residence 30. For example, the tenants of Apts. 1-3 may each provide a telephone number for their respective apartments. Therefore, when one of buttons 26a-c is pressed, call box 20 will call that apartment's corresponding telephone number programmed.

The telephone number provided to the building management may, for instance, be a cellular telephone number of one of a particular apartment's residents, a home telephone number of that particular apartment, or a telephone number associated with a user account on a backend system 100. Backend system 100, which is described in greater detail below, may include various applications or skills, and may store various user accounts thereon. In some embodiments, a user account on backend system 100 may have an assigned telephone number. For example, a user account of backend system 100 may be assigned the telephone number "222-2222." In this particular scenario, when the telephone number "222-2222" is called, the call may be received by the associated user account on backend system 100.

Call box 20, in some embodiments, may have a specific telephone phone number associated with it, such as "111-1111." When one of call box buttons 26a-c is pressed, call box 20 may call the associated telephone number (e.g., number "222-2222") from telephone number "111-1111." In some embodiments, the user account on backend system 100 may be programed such that whenever the telephone number associated with call box 20 (e.g., number "111-1111") calls, one or more predefined actions occur. For example, if call box 20 is determined to be calling, backend system 100 may generate and provide an audio message to play through speaker(s) 22 on call box 20. Backend system 100, therefore, may serve as a recipient of the telephone call from call box 20 to determine whether or not individuals are to be allowed access to residence 30.

In some embodiments, a user having a user account on backend system 100 may program a passphrase that, if spoken into call box 20, allows access to residence 30. For example, the passphrase may be a word, such as "Tiger" or "Open," or the passphrase may be a series of words, such as "Open Sesame" or "I am here for the party!" The passphrase, in general, may correspond to any particular word, series of words, or phrase, such as a series of temporally-related sounds, or to any series of machine generated sounds, such as a fax machine. Modem, robot, unmanned aircraft, or any other electronic device. In some embodiments, as described in greater detail below, a user may select an event that the passphrase will be used for (e.g., a party, a delivery, etc.), and then program a passphrase for that event.

Individual 2 may, for example, press button 26a associated with "Apt. 1" on call box 20. In response to pressing button 26a, call box 20 makes a phone call 12 to phone number "222-2222" on backend system 100, which may be the phone number programmed as being associated with "Apt. 1." In some embodiments, backend system 100 may monitor the phone number of any incoming telephone call to determine that phone number is recognized. For example, a telephone call from the number "111-1111" may corresponds to a call from call box 20. If the telephone number is recognized as call box 20, backend system 100 may provide a passphrase question to call box 20 to allow an individual, such as individual 2, to enter residence 30.

As mentioned previously and described in greater detail below, a user having a user account on backend system 100 may program a passphrase, and backend system 100 may generate a passphrase question for that passphrase. In some embodiments, the passphrase that is programmed may be a word typed by the user on their user device. Backend system 100 may analyze the word, as well as an intent of use for the word, to determine a passphrase question 4. Backend system 100 may then generate an audio message 14 for passphrase question 4 using text-to-speech functionality. For example, the programmed passphrase may be, "Tiger." In this particular scenario, the generated passphrase question 4 may be, "What is the passphrase?" In response to providing audio message 14, call box 20 may play audio message 14 using speaker(s) 22.

Individual 2 may provide a response to audio message 14 using call box 20. In one exemplary embodiment, microphone(s) 24 of call box 20 may receive audio message 16 spoken by individual 2. For example, audio message 16 may correspond to the word, "Tiger." Audio message 16 may then be communicated to backend system 100 using call box 20. In some embodiments, audio message 16 may be analyzed using keyword spotting technology to determine whether or not a portion of audio message 16 includes the passphrase. For example, a likelihood score may be generated that indicates how likely it is that audio message 16 includes an utterance of the passphrase. The likelihood score may then be compared against a predefined threshold value, which is used to declare whether a particular audio signal is a particular word. If the likelihood score is greater than the threshold value, it is determined that audio message 16 includes an utterance of the passphrase. In some embodiments, however, audio message 16 may be converted from speech to text 6 using speech-to-text ("STT") functionality of backend system 100. In this particular scenario, text 6 of audio message 16 may be compared with the programmed passphrase to determine whether or not text 6 includes an instance of the passphrase.

After determining that passphrase question 4 has been correctly answered, backend system 100 may determine that access to residence 30 is to be provided. This may be done by backend system 100 determining a dual-tone sound 8 that includes a low frequency sinusoidal tone and a high frequency sinusoidal tone corresponding to a particular button on a touch-tone keypad (e.g., the number "9"). An audio signal 18 may then be generated that represents dual-tone sound 8 such that when the low frequency and high frequency tones are played substantially simultaneously, a lock for door 10 is caused to go from a "locked" state to an "unlocked" state. This may enable individual 2 to open door 10 to gain access to residence 30. Persons of ordinary skill in the art will recognize that various protocols for using an audible sound to unlock a door are well known, and the specific protocols need not be discussed in greater detail herein.

Figure 2:
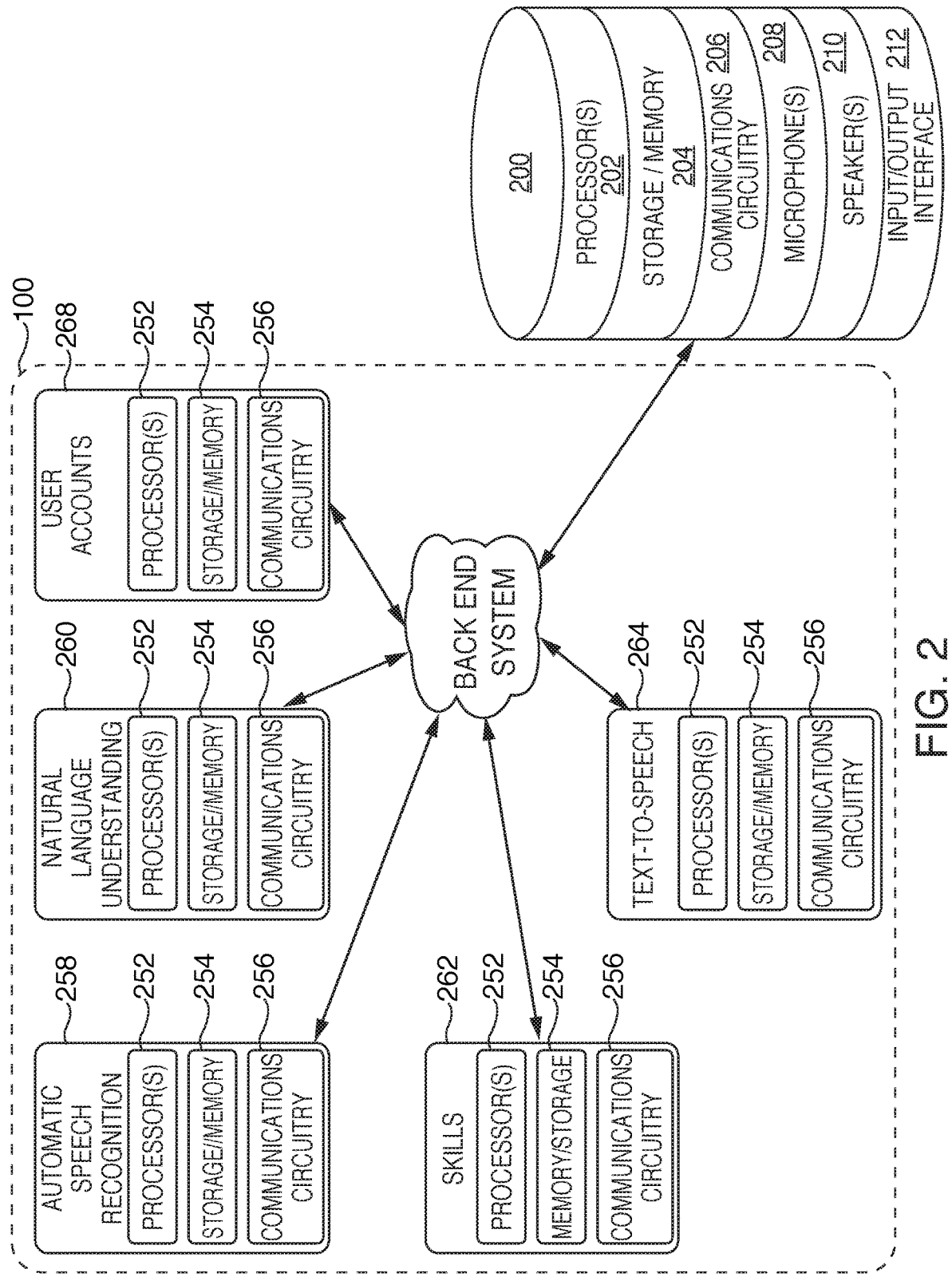
FIG. 2 is an illustrative diagram of the system of FIG. 1, in accordance with various embodiments.

FIG. 2 is an illustrative diagram of the system of FIG. 1, in accordance with various embodiments. FIG. 2, in the illustrative, non-limiting embodiment, includes electronic device 200, which is in communication with backend system 100. Electronic device 200 may correspond to any type of electronic device including, but not limited to, desktop computers mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 200 may be a sound controlled electronic device, such as a voice activated electronic device, and may be relatively simple or basic in structure such that no mechanical input option(s) (e.g., keyboard, mouse, trackpad) or touch input(s) (e.g., touchscreen, buttons) may be provided. For example, electronic device 200 may be able to receive and output audio, and may include power, processing capabilities, storage/memory capabilities, and communication capabilities. In one particular scenario, electronic device 200 may include a minimal number of input mechanisms, such as a power on/off switch, however primary functionality, in one embodiment, of electronic device 200 may solely be through audio input and audio output. In some embodiments, however, non-voice activated devices may also communicate with backend system 100 (e.g., push-to-talk devices).

Electronic device 200 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within electronic device 200, and/or one or more components may be omitted. For example, electronic device 200 may include a power supply or a bus connector. Furthermore, while multiple instances of one or more components may be included within electronic device 200, for simplicity only one of each component has been shown.

Processor(s) 202 may include any suitable processing circuitry capable of controlling operations and functionality of electronic device 200, as well as facilitating communications between various components within electronic device 200. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 200, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 200. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., games, music, video, calendars, lists, etc.) may be run by processor(s) 202, and may be stored in memory 204. In some embodiments, storage/memory 204 may include one or more modules and/or databases, such as a speech recognition module, a natural language understanding module, and a speech-to-text/text-to-speech module.

Communications circuitry 206 may include any circuitry allowing or enabling electronic device 200 to communicate with one or more devices, servers, and/or systems. For example, communications circuitry 206 may facilitate communications between electronic device 200 and backend system 100. Communications circuitry 206 may use any number of communication protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 200 and backend system 100. In some embodiments, electronic device 200 may communicate with backend system 100 via a web browser using HTTP. Various additional communication protocols may be used to facilitate communications between backend system 100 and electronic device 200 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP, such as any of the previously mentioned exemplary communications protocols. In some embodiments, electronic device 200 may include an antenna to facilitate wireless communications with a network using various wireless technologies (e.g., Wi-Fi, Bluetooth®, radiofrequency, etc.). In yet another embodiment, electronic device 200 may include one or more universal serial bus ("USB") ports, one or more Ethernet or broadband ports, and/or any other type of hardwire access port so that communications circuitry 206 allows electronic device 200 to communicate with one or more communications networks.

Electronic device 200 may also include one or more microphones 208 and/or transducers. Microphone(s) 208 may be any suitable component capable of receiving audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 200 may include multiple microphones (e.g., four, seven, ten, etc.) placed at various positions about electronic device 200 to monitor/capture any audio outputted in the environment where electronic device 200 is located. The various microphones 208 may include some microphones optimized for distant sounds, while some microphones may be optimized for sounds occurring within a close range of electronic device 200.

Electronic device 200 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 200 may be located. In some embodiments, speaker(s) 210 may include headphones or ear buds, which may be wirelessly wired, or hard-wired, to electronic device 200, that may be capable of broadcasting audio directly to an individual. In some embodiments, one or more microphones 208 may serve as input devices to receive audio inputs, such as speech. Electronic device 200, in the previously mentioned embodiment, may then also include one or more speakers 210 to output audible responses. In this manner, electronic device 200 may function solely through speech or audio, without the use or need for any input mechanisms or displays, however persons of ordinary skill in the art will recognize that this is merely exemplary.

In one exemplary embodiment, electronic device 200 includes I/O interface 212. The input portion of I/O interface 212 may correspond to any suitable mechanism for receiving inputs from a user of electronic device 200. For example, a camera, keyboard, mouse, joystick, or external controller may be used as an input mechanism for I/O interface 212. The output portion of I/O interface 212 may correspond to any suitable mechanism for generating outputs from electronic device 200. For example, one or more displays may be used as an output mechanism for I/O interface 212. As another example, one or more lights, light emitting diodes ("LEDs"), or other visual indicator(s) may be used to output signals via I/O interface 212 of electronic device 200. In some embodiments, one or more vibrating mechanisms or other haptic features may be included with I/O interface 212 to provide a haptic response. Persons of ordinary skill in the art will recognize that, in some embodiments, one or more features of I/O interface 212 may be included in a purely voice activated version of electronic device 200. For example, one or more LED lights may be included on electronic device 200 such that, when microphone(s) 208 receive audio, the one or more LED lights become illuminated signifying that audio has been received by electronic device 200. In some embodiments, I/O interface 212 may include a display screen and/or touch screen, which may be any size and/or shape and may be located at any portion of electronic device 200. Various types of displays may include, but are not limited to, liquid crystal displays ("LCD"), monochrome displays, color graphics adapter ("CGA") displays, enhanced graphics adapter ("EGA") displays, variable graphics array ("VGA") display, touch screens, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, skills module 262, text-to-speech module 264, and user accounts module 268. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as, a speaker identification ("ID") module, or any other module, or any combination thereof.

ASR module 258 may be configured such that it recognizes human speech in detected audio, such as audio captured by electronic device 200, which is then transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

ASR module 258 may include an expression detector that analyzes audio signals received by backend system 100. Such audio signals may, for instance, may correspond to one or more words, or temporally related sounds, spoken by an individual. For example, the spoken words may correspond to a passphrase provided in response to a passphrase question for allowing/preventing an individual from gaining access to residence 30. The passphrase may, for example, be a predefined word, phrase, or any other sound, sound data, machine generated sounds, or any series of temporally related sounds. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the passphrase is represented within the audio signal. The expression detector may then compare that score to a threshold value to determine whether the passphrase will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific passphrase expressions. An HMM model represents a word as a series of states. Generally a portion of an audio signal is analyzed by comparing its HMM model to an HMM model of the passphrase expression, yielding a feature score that represents the similarity of the audio signal model to the passphrase expression model.

In practice, an HMM recognizer may produce multiple feature scores, corresponding to different features of the HMM models. A passphrase detector may use a support vector machine ("SVM") classifier that receives the one or more feature scores produced by the HMM recognizer. The SVM classifier produces a confidence score indicating the likelihood that an audio signal contains the passphrase. The confidence score is compared to a confidence threshold to make a final decision regarding whether a particular portion of the audio signal represents an utterance of the passphrase. Upon declaring that the audio signal represents an utterance of the passphrase, backend system 100 may send audio signal 18 to call box 20, which, when played through speaker(s) 22, causes door 10 to become unlocked.

NLU module 260 may be configured such that it determines user intent based on the received audio. For example, NLU module 260 may receive audio message 16 including answer 6. NLU module 260 may determine that the intent of message 16 is a response to question 4. In response to determining the intent of message 16, NLU module 260 may communicate the received audio message with an appropriate skills module 262 to perform an appropriate response. NLU module 260 may include processor(s) 252, storage/memory 254, and communications circuitry 256 which, in one embodiment, are substantially similar to processor(s) 202, storage/memory 204, and communications circuitry 206 of electronic device 200, and the previous description may apply.

In some embodiments, a user having a user account on backend system 100 may set or program a passphrase that, when detected by call box 20 and received by backend system 100, causes backend system 100 to generate audio signal 18 that unlocks door 10. The passphrase may be programmed directly on electronic device 200, or a passphrase may be set by a backend system application that is running on electronic device 200 that is in communication with backend system 100. For example, a backend system application running on electronic device 200 (e.g., mobile device) may be used to set the passphrase. The specific passphrase may then be communicated from electronic device 200 to backend system 100, which in turn may send audio message 14 to call box 20. In some embodiments, the selected passphrase may also be stored in storage/memory 204, as well as on backend system 100.

Skills module 262 may, for example, correspond to various action specific skills or servers capable of processing various task specific actions. Skills module 262 may further correspond to first party applications and/or third party applications capable of performing various tasks or actions. For example, based on the context of audio received from electronic device 200, backend system 100 may use a certain application or skill to generate a response, which in turn may be communicated back to electronic device 200. Skills module 262 may include processor(s) 252, storage/memory 254, and communications circuitry 256. As an illustrative example, skills 262 may correspond to one or more game servers (e.g., "Simon Says," karaoke, etc.), or one or more weather servers (e.g., for weather information).

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256. In some embodiments, skills module 262 may further generate passphrase question 4 as well as audio message 14 including question 4. For example, skills module 262 may receive a selection of an event from the user, and may provide a prompt to the user to input a passphrase of the user's choice. The user may then type or speak the passphrase into electronic device 200, which in turn communicates the passphrase selection to backend system 100. Skills module 262 may then generate text corresponding to a question whose answer is the passphrase. This question may then be converted from text to speak, using TTS module 264 in order to generate audio message 14.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within user profile module 318. In some embodiments, user accounts module 268 may store a voice signal for a specific user profile. This may allow speaker identification techniques to be used to match a voice to voice biometric data associated with a specific user profile. In some embodiments, user accounts module 268 may store a telephone number assigned to a particular user profile. When the assigned telephone number for a user profile is called, one or more actions may be performed by backend system 100, such as answering the call and providing one or more questions to be answered.

Persons of ordinary skill in the art will recognize that although each of ASR module 258, NLU module 260, skills module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, skills module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 3:
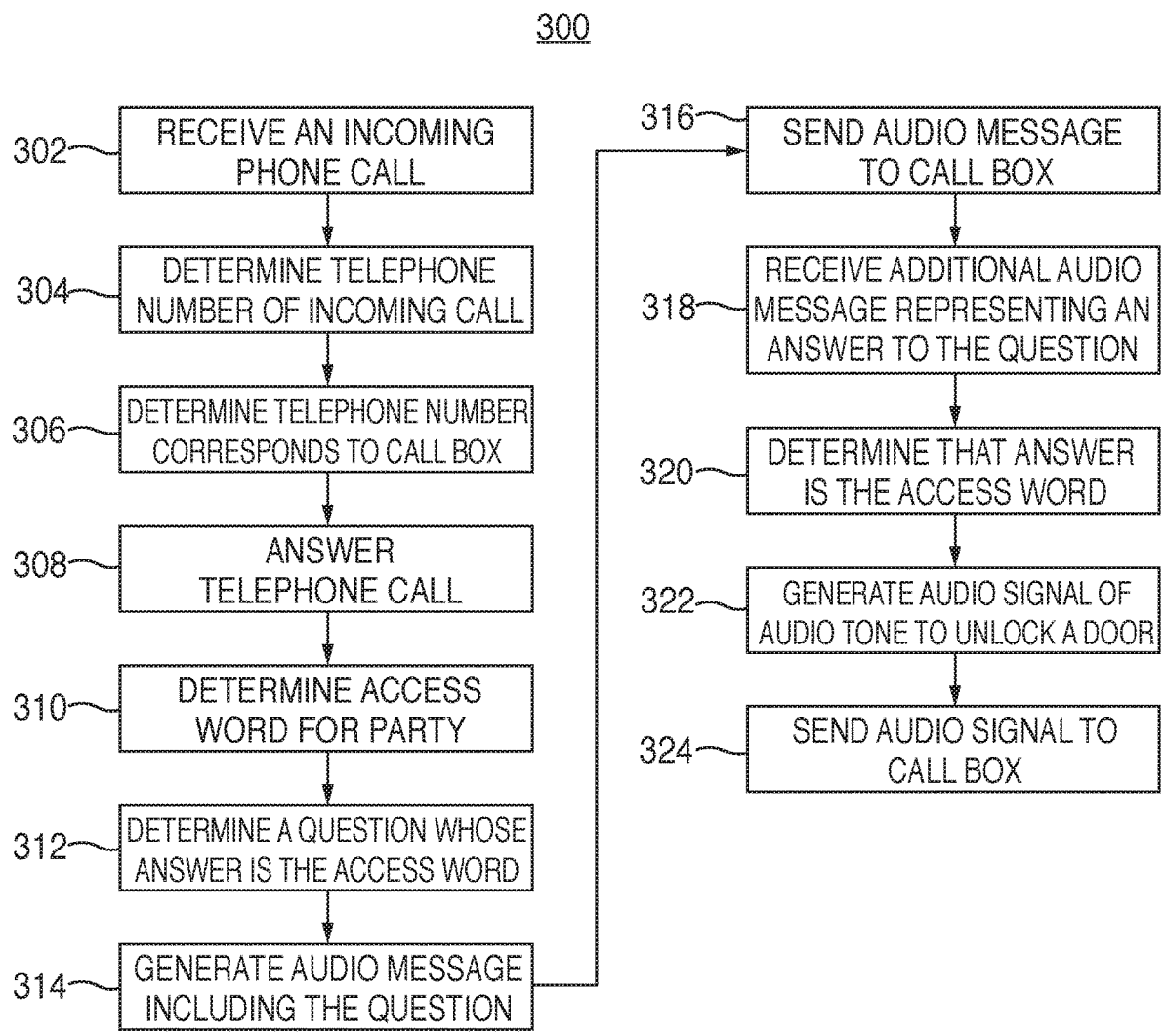
FIG. 3 is an illustrative flowchart of a process for determining whether an answer to a question includes an access word, in accordance with various embodiments.

FIG. 3 is an illustrative flowchart of a process for determining whether an answer to a question includes an access word, in accordance with various embodiments. Process 300, in the exemplary embodiment, may begin at step 302. At step 302, an incoming phone call is received by backend system 100. In some embodiments, a user account stored within user accounts module 268 of backend system 100 may have an assigned telephone number. For example, a user may obtain a separate service that provides and assigns a telephone number to their user account. By doing this, individuals calling the assigned telephone number may communicate with one or more services on backend system 100. In some embodiments, a user account on user accounts module 268 having an assigned telephone number may use backend system 100 to act as a telephone service provider. For example, a user may log into their user account on backend system 100 using their user device (e.g., electronic device 200), and may make telephone calls to other telephone numbers through backend system 100. User accounts module 268 may then be able to communicate with any other devices using any of the aforementioned communication protocols. In some embodiments, an apartment resident of residence 30 (e.g., a resident of Apt. 1) may have a user account on backend system 100 that has an assigned telephone number. If an individual who is attempting to gain access to residence 30, for example, presses button 26a on call box 20, call box 20 will then call the assigned telephone number for Apt. 1.

At step 304, a telephone number corresponding to the incoming telephone call may be determined. Each telephone, or end point, has a specific identification number or address. For example, when one telephone calls another telephone, the telephone numbers for either device may be made known to one another. An illustrative example of this is caller identification, which may displays the telephone number associated with an incoming telephone call. Individuals may use caller identification to determine whether or not the person that is calling is someone that they would like to speak with. Similarly, at step 304, the telephone number of the device that makes the telephone call of step 302 is determined. At step 306, a determination may be made that the telephone number used to make the phone call of step 302 corresponds to call box 20. For example, a user account on backend system 100 corresponding to an apartment resident of residence 30 may determine that the telephone number used to make phone call 12 is the telephone number 111-1111. Backend system 100 may then determine that the telephone number 111-1111 corresponds to call box 20 of residence 30. In some embodiments, backend system 100 may store each number that calls the assigned telephone number (e.g., 222-2222). A user may then be able to assign contact information to, or program a contact as being associated with, one or more of the stored telephone numbers. In some embodiments, however, the user may program a contact as being associated with a specific telephone number prior to that number calling. For example, upon providing the telephone number 222-2222 to building management of residence 30 to be used for call box 20, a user may program the number 111-1111 as being associated with call box 20. As another example, a user account on backend system 100 may be associated with a user name and password, a unique personal identification number ("PIN"), or one time code, instead of, or in addition to being associated with a specific telephone number.

At step 308, backend system 100 may answer incoming telephone call 12 in response to determining that the telephone number of incoming telephone call 12 corresponds to call box 20. By answering telephone call 12, backend system 100 and call box 20 have established a two-way communication line with one another. In this way, audio may be freely communicated to either end point (e.g., call box 20 and backend system 100) across one or more of the aforementioned communication protocols. In some embodiments, if the telephone number that calls the user account's assigned telephone number does not correspond to call box 20, backend system 100 may not answer the call. For example, if a telephone number not programmed as being a contact of the user account (e.g., telephone number "333-3333") calls, backend system 100 may determine that this telephone call should not be answered.

In some embodiments, a user having a user account on backend system 100 may set a time period for when backend system 100 is to be used to answer any incoming telephone call from call box 20. For example, an apartment resident may be having a party and may decide to use their user account's assigned telephone number to answer incoming telephone calls from call box 20. In this way, backend system 100 may function as a virtual door person. The apartment resident may set a start time and an end time for their party, for instance, such that any time an individual presses their call box button (e.g., button 26a) during that time period, backend system 100 may answer the incoming telephone call therefrom.

At step 310, an access word for a party occurring at Apt. 1 of residence 30 may be determined. For example, a user may set an access word that, when spoken into call box 20 by an individual, will provide the individual with access to residence 30. The user may program the access word using, in one embodiment, electronic device 200. For example, a user may use a client application on electronic device 200 to access their user account on backend system 100. Upon accessing their user account, the user may select a type of event that the access word is to be used for, and may also program the access word. As an illustrative example, the user may select (e.g., from a drop down menu) a type of event as a party. In response, a text box may be provided on electronic device 200 for the user to input the access word. For example, the user may input the word, "Tiger" as the access word. Persons of ordinary skill in the art will recognize that any word, words, or series of temporally related sounds may be used as the access word and the aforementioned is merely exemplary. Furthermore, persons of ordinary skill in the art will recognize that step 310 may, in some embodiments, occur prior to incoming telephone call 12 of step 302 being received.

At step 312, a question whose answer is the access word may be determined. In some embodiments, the question may be determined by backend system 100 based on the access word as well as, or alternatively, the type of event that the access word is being used for. For example, if the event is a party, the determined question may be, "What is the party's access word?" As another example, if the event is a package delivery, the determined question may be, "Hello! This is Apt. 1's door person. What is the access word?" In some embodiments, however, instead of programming in only the access word at step 312, a user may also program in the question to be used. For example, the user may type into their companion application on electronic device 200 the access word and the question to be used for that access word. In some embodiments, furthermore, step 312 may also be performed by backend system 100 prior to incoming telephone call 12 being received at step 302, and the aforementioned is merely exemplary.

In some embodiments, a user may program the access word and/or question by speaking the access word and/or question to electronic device 200. For example, in some embodiments, electronic device 200 may be a voice activated electronic device. In this particular scenario, the user may speak a command that activates electronic device 200, and then may speak the desired access word and/or question to electronic device 200. Electronic device 200 may then communicate audio data representing speech of the user saying the access word and/or question to backend system 100. Upon receipt, backend system 100, using ASR module 258, NLU module 260, and/or skills module 262, may convert the speech to text to determine the user's intent. In response to determining that the user is intending to program an access word and/or question, backend system 100 may identify the word or words from the converted text that are to be used for the access word and/or question, and program those words in a corresponding skill or application to be used for providing the access word and/or question to call box 20.

At step 314, an audio message including the question may be generated. Generating the question may, in some embodiments, correspond to converting the determined question from step 312 into speech using TTS module 264 on backend system 100. For example, if the determined question is, "What is the party's access word?", the generated audio message would include audio of each word of the question in the desired order. In some embodiments, generating the audio message may also include generating each word with a certain inflection, accent, tone, and/or volume/intensity. After the audio message is generated, the audio message (e.g., audio message 14) may be sent from backend system 100 to call box 20 using any of the previously mentioned communications protocols. In some embodiment, upon receipt of audio message 14, call box 20 may play audio message 14 through its speaker(s) 22. Each of steps 314 and 316 may occur in a substantially minimal amount of time such that, for example, individual 2 presses call box button 26a on call box 20 and audio message 14 plays through speaker(s) 22 with minimal latency. As an illustrative example, the delay between a time that individual 2 presses call box button 26a and a time that audio message 14 plays through speaker(s) 22 may be only a few milliseconds or less.

After audio message 14 plays question 4 through speaker(s) 22 on call box 20, individual 2 may say an answer in response. Audio signals of the answer may be received by microphone(s) 24 on call box 20. Call box 20 may then send audio message 16 including the answer to backend system 100 using any of the previously mentioned communication protocols. Thus, at step 318, additional audio message 16 may be received by backend system 100, and audio message 16 may represent the answer to question 4. In some embodiments, upon receipt of audio message 16, backend system 100 may generate text 6 representing audio message 16.

At step 320, a determination may be made by backend system 100 as to whether audio message 16 representing the answer includes the access word. As previously mentioned, backend system 100 may include an expression detector implementing keyword spotting technology that evaluates audio signals to detect the presence of a predefined word or expression. In this particular scenario, the expression detector may analyze audio message 16 to determine whether the answer provided includes the access word (e.g., "Tiger"). If so, a true output (e.g., logical 1) may be provided to indicate that audio message 16 includes an occurrence of the access word. If not, a false output (e.g., logical 0) may be provided that indicates that audio message 16 does not include an occurrence of the access word. In some embodiments, the expression detector may compare each word determined to be within audio message 16 to the access word to determine whether or not any of the words are the access word.

At step 322, an audio signal 18 is generated in response to determining at step 320 that audio message 16 includes an occurrence of the access word, and at step 324, audio signal 18 is sent from backend system 100 to call box 20. Upon receiving audio signal 18, speaker(s) 22 of call box 20 play audio signal 18, which in turn causes door 10 to unlock, thereby allowing individual 2 to enter residence 30. Audio signal 18 may, for example, correspond to an audible tone having a particular frequency such that, when played, it causes a lock for door 10 to go from a locked state to an unlocked state. Many hand-held mobile devices, such as mobile phones for example, include touch-tone keypads. Each button on the keypad represents a number (e.g., 0-9) and/or one or more letters in the alphabet. Each of the keypad buttons may produce a dual-tone multi-frequency ("DTMF") signaling pitch consisting of two simultaneously played pure tone sinusoidal frequencies. The two frequencies, together, correspond to a specific button on the keypad. For example, the number "1" on a typical 4-button by 3-button keypad grid corresponds to two frequencies, 697 Hz and 1209 Hz. As another example, the number "0" on the same keypad grid corresponds to the frequencies, 941 Hz and 1336 Hz.

When the keyword generator on backend system 100 outputs a true, or logical 1, backend system 100 determines the button that needs to be pressed on a keypad to open door 10, and generates an audible tone for that button. For example, an individual may have to press the number "9" on their touch-tone phone in order to generate an audible signal that unlocks door 10 from call box 20. In this scenario, backend system 100 determines the frequencies that map to the button 9 on a keypad, and generate audio signal 18 including those two frequencies. Thus, when audio signal 18 is sent to call box 20, and call box 20 subsequently plays audio signal 18 through speaker(s) 22, a lock for door 10 receives an electrical strike that unlocks the lock, thereby enabling individual 2 to enter residence 30 through door 10.

In some embodiments, instead of determining that audio message 16 includes the access word using keyword spotting, audio message 16 may instead be converted from speech to text 6 using STT module 266. In this particular example, a substantially similar process may occur with the exception that upon identifying a word, text 6 for that word is generated and analyzed. However, persons of ordinary skill in the art will recognize that either methodology may be used.

Figure 4:
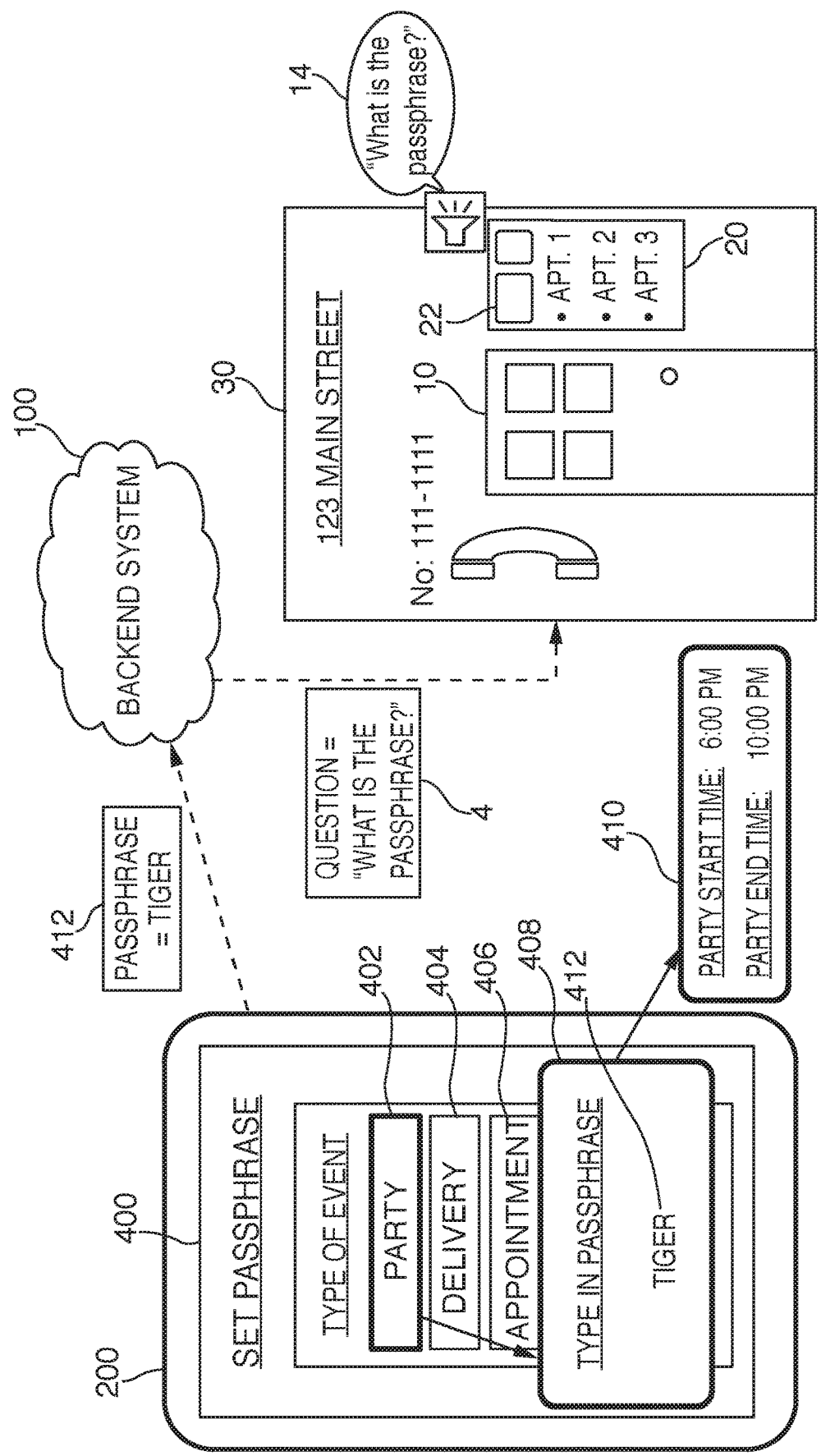
FIG. 4 is an illustrative diagram of a system for setting a passphrase and a time period for when the passphrase is to be used, in accordance with various embodiments.

FIG. 4 is an illustrative diagram of a system for setting a passphrase and a time period for when the passphrase is to be used, in accordance with various embodiments. As previously mentioned, a user may set a time period for when a passphrase question is to be used to allow individuals to access residence 30 or any other secured area. In some embodiments, a user may determine an event to use the passphrase question for using electronic device 200. Electronic device 200 may, for instance, include user interface 400 displayed on a display screen (e.g., I/O interface 212). In some embodiments, I/O interface 212 may include a touch screen display capable of presenting user interface 400 as well as recognizing touch inputs thereon.

The various types of events that a user may choose from using user interface 400 may include, but are not limited to, a party option 402, a delivery option 404, or an appointment 406. In one embodiment, the user may select party option 402. In response to selecting party option 402, the user may be provided with a text input box 408, where the user may type in the passphrase, such as passphrase 412, to use for party option 402. The user may type the passphrase into textual input box 408 using a keypad on electronic device 200, for example. In response to inputting passphrase 412 into text box 408, the selection of passphrase 412 may be provided to backend system 100. Persons of ordinary skill in the art will also recognize that the selection of option 402, and providing of passphrase 412 thereafter may occur via vocal commands. For example, if electronic device 200 includes voice activation features, the user may speak a command to electronic device 200, which may translate into an action selecting party option 402 and/or providing passphrase 412.

In some embodiments, in response to inputting passphrase 412 into input box 408, time selection box 410 may be displayed on user interface 400. Time selection box 410 may enable the user to select a start time and an end time for the event (e.g., a party). In some embodiments, time selection box 410 may further control when backend system 100 will be used to receive incoming phone calls from call box 20. However, time selection box 410 may also, or alternatively, be able to control when a passphrase question, such as passphrase question 4, will be used by backend system 100 to allow or not allow individuals to enter residence 30.

Figure 5:
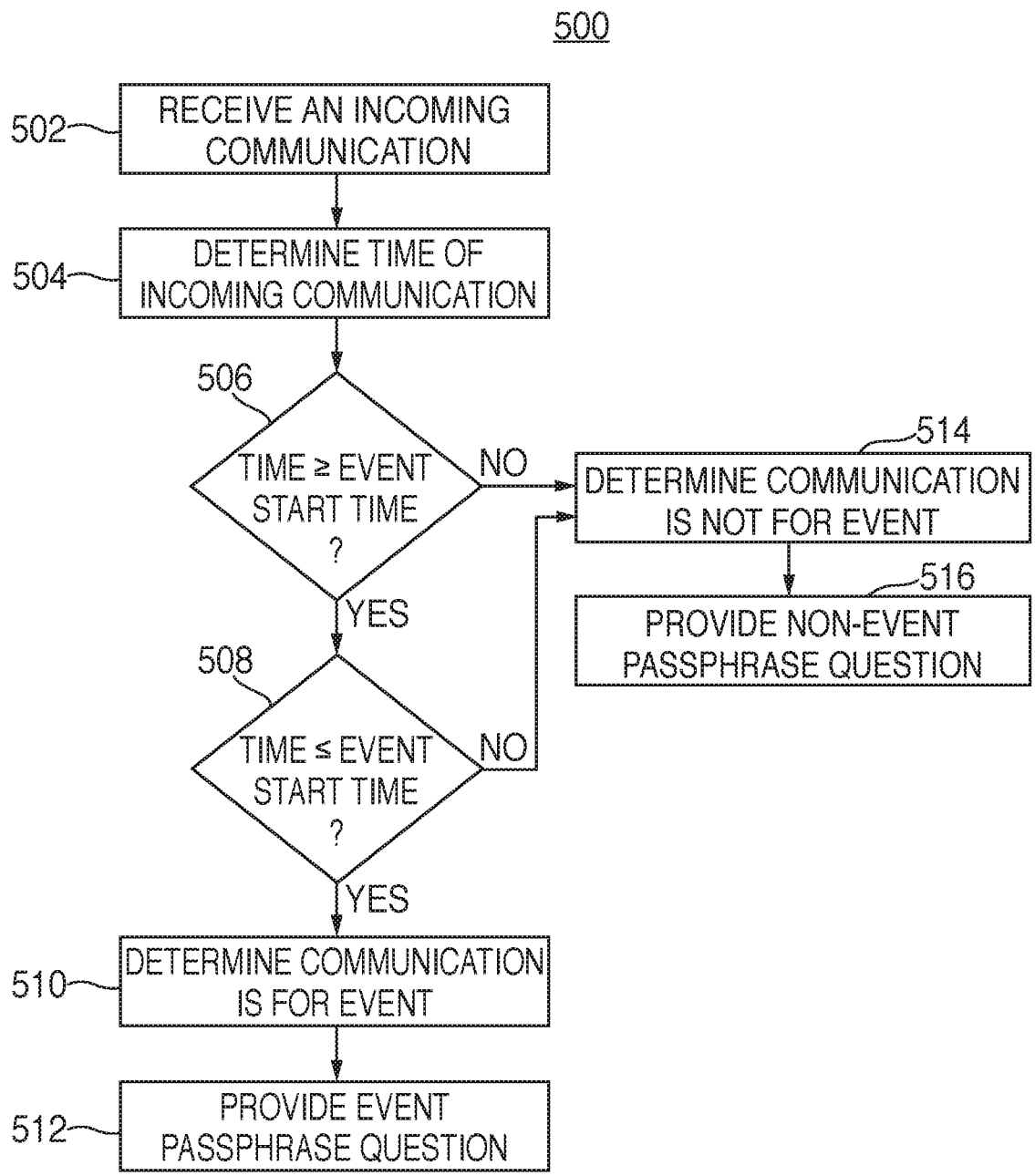
FIG. 5 is an illustrative flowchart of a process for providing a passphrase question in response to determining that a communication is received within a specified time period, in accordance with various embodiments.

FIG. 5 is an illustrative flowchart of a process for providing a passphrase question in response to determining that a communication is received within a specified time period, in accordance with various embodiments. Process 500, in the exemplary embodiment, may begin at step 502. At step 502, an incoming communication may be received. For example, telephone call 12 may be received by backend system 100, and in particular a user account on backend system 100 having an assigned telephone number (e.g., 222-2222), from call box 20. In some embodiments, step 502 of process 500 may be substantially similar to step 302 of process 300, and the previous description may apply. In some embodiments, the incoming phone call is only received if the phone number of that the incoming phone call is coming from is recognized. For example, phone call 12 may be answered by backend system 100 if the telephone number is associated with call box 20 (e.g., 111-1111).

At step 504, a time that the incoming communication of step 502 is received may be determined. Each incoming communication (e.g., telephone call 12) may have a time-stamp associated with it that signifies the time that the telephone call is received by backend system 100. That time may be used to determine whether or not the incoming communication is received within a predefined time period that an event, such as a party, is occurring.

At step 506, a determination may be made as to whether or not the incoming communication occurs at a time later than or equal to a start time for the event. If, at step 506, it is determined that the time of the incoming communication is earlier than the start time of the event, then process 500 may proceed to step 514. At step 514, a determination may be made that the incoming communication is not for the event, and process 500 may proceed to step 516 where a non-event passphrase question, for instance, may be provided. As an illustrative example, if the start time of the party is 6:00 PM, as shown in FIG. 4, and the incoming communication occurs at 5:00 PM, a passphrase question for allowing entrance to residence 30 may be provided that is unrelated to a passphrase question that will be used for the allowing access to residence 30 for the party. For example, backend system 100 may have two separate passphrases, and therefore two different passphrase questions, for incoming communications received during the time period of the event and incoming communications that are not received during the time period of the event.

If, however, at step 506, it is determined that the time that the incoming communication of step 502 is received is later than or equal to the start time for the event, then process 500 may proceed to step 508. At step 508, a determination is made as to whether or not the time that the incoming communication is received occurs before, or equal to, the end time of the event. If the incoming communication is received at a time after the end time for the event, then process 500, in one embodiment, may proceed to step 514. For instance, continuing the illustrative example above, if the end time of the party is 10:00 PM, as shown in FIG. 4, and the incoming communication occurs, instead, at 11:00 PM, then it may be determined that the incoming communication is not for the event, and a non-event related passphrase question may be provided. However, if the incoming communication is received earlier than, or equal to, the end time of the event, the process 500 may proceed to step 510. For example, if the incoming communication is received at time 8:00 PM, this communication may be related to the event that is occurring between the times 6:00 PM and 10:00 PM.

At step 510, a determination is made that the incoming communication of step 502 is for the event. This may be due to the time that the incoming communication is received by backend system 100 is within the time period set for the event (e.g., steps 506 and 508). At step 512, a passphrase question for that event may be provided. For example, communications received during the party's programmed time period (e.g., between 6:00 and 10:00 PM) may cause the passphrase question, "What is the passphrase for the party?" to be provided to call box 20, which in turn may output audio message 14 of the passphrase question using its speaker(s) 22. In this particular scenario, the individual (e.g., individual 2) who initiated the communication may hear audio message 14, and in turn may speak a response in an attempt to gain access to residence 30. Backend system 100 may then analyze audio message 16 of the response to determine whether audio message 16 includes an utterance of the passphrase and, if so, may also provide access to residence 30. In some embodiments, process 500 may proceed to step 318 of process 300 after either of steps 512 or 516 of process 500 so that a response to the passphrase question may be analyzed and an audio signal to unlock door 10 of residence 30 may be provided.

Figure 6:
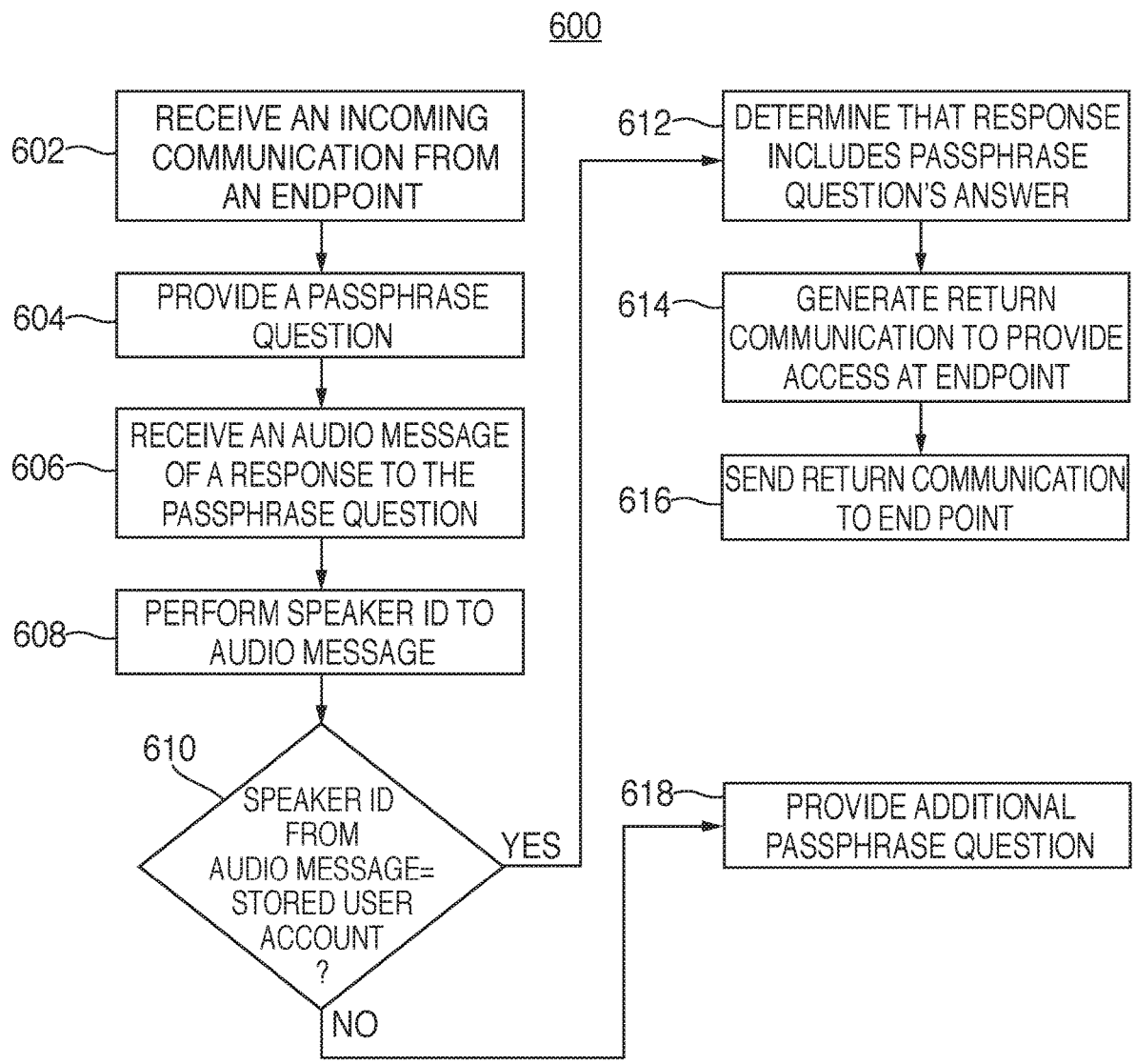
FIG. 6 is an illustrative flowchart of a process for determining that a response to a passphrase question is spoken by an individual that has a user profile stored on backend system 100, in accordance with various embodiments.

FIG. 6 is an illustrative flowchart of a process for determining that a response to a passphrase question is spoken by an individual having a user account on backend system 100, in accordance with various embodiments. Process 600, in one exemplary embodiment, may begin at step 602. At step 602, an incoming communication may be received from an endpoint. For example, backend system 100 may receive incoming phone call 12 from call box 20. In some embodiments, however, the incoming communication may be sent to backend system 100 from a source other than call box 20, such as a mobile device.

At step 604, a passphrase question may be provided to the endpoint that the incoming communication of step 602 was received from. In some embodiments, backend system 100 may be configured such that it only receive communications from one particular source. For example, backend system 100 may be programmed as a door person for residence 30, and therefore its communications would only be from call box 20. Thus, in this particular scenario, backend system 100 may have a passphrase question that is used to allow individuals to gain access to residence 30, which backend system 100 provides to the endpoint (e.g., call box 20) upon receipt of any incoming communication.

At step 606, an audio message of a response to the passphrase question provided at step 604 may be received by backend system 100. For example, individual 2 may speak an answer to the passphrase question to call box 20. Audio signals representing the answer are received by microphone(s) 24 of call box 20, and audio message 16 representing the answer may be sent from call box 20 to backend system 100. In some embodiments, steps 602, 604, and 606 of process 600 may be substantially similar to steps 302, 314, and 318 of process 300, and the previous descriptions may apply.

At step 608, backend system 100 may perform speaker identification ("ID") on audio message 16 upon receipt. Speaker identification may include any functionality that analyzes the audio signals of audio message 16, and produces a true/false outputs (e.g., logical 1/0) if the speech pattern corresponds to a particular sound frequency stored in memory. In some embodiments, voice biometric data, such as a voice pattern, inflection, accent, and/or tone, of a user may be stored in their user account within user accounts module 268. In response to receiving audio message 16, for example, the speaker identification functionality may analyze the speech pattern audio message 16, and determine whether the speech pattern matches voice biometric data associated with a user account.

In one exemplary embodiment, in response to receiving audio message 16, backend system 100 may access an invitation list of a party occurring at residence 30. For example, skills module 262 may include an invite module that stores names, phone numbers, and/or user accounts of individuals that are invited to a party occurring at residence 30. Upon receipt of audio message 16, backend system 100 may analyze the voice used to speak answer 16, and may determine whether or not that voice matches voice biometric data associated with a user account listed on the party's invitation list. For example, the party's invitation list may be accessed, each guests' name on the invitation list may be obtained, a telephone number of each guest may be determined, and a user account within user accounts module 268 may be determined that is associated, if applicable, with each telephone number. Voice biometric data associated with each user account may then be retrieved and compared with the voice used to speak answer 16.

At step 610, a determination is made as to whether or not the speaker identification positively identifies voice biometric data of an individual stored within a user account on user accounts module 268. If so, process 600 may proceed to step 612, where a determination is then made as to whether or not audio message 16 includes the correct passphrase. For example, upon determining that the voice used within audio message 16 corresponds to a voice pattern stored within a user account, backend system 100 may determine that audio message 16 includes the programmed passphrase.

At step 614, a return communication for providing access at the endpoint may be generated. For example, the return communication may be an audible tone that outputs through a call box and, when outputted, causes a lock for a door to become unlocked. As another example, the return communication may be a signal that instructs a lock to go from a locked state to an unlocked state. As still another example, the return communication may be a signal that causes a door or window to physically open. At step 616, the return communication of step 614 may be sent to the end point. In some embodiments, steps 614 and 616 of process 600 may be substantially similar to steps 322 and 324 of process 300, and the previous description may apply.

If, at step 610, it is determined that the voice pattern does not correspond to voice biometric data stored within a user account on user accounts module 268, process 600 may proceed to step 618, where an additional or different passphrase question may be provided to the end point. For example, if the initial passphrase question is, "What is the passphrase?", the additional passphrase question used at step 618 may be, "What is your name?" Any passphrase question may be used as the additional passphrase question for step 618, and in some embodiments, the same passphrase question initially provided at step 604 may be provided again at step 618.

Figure 7:
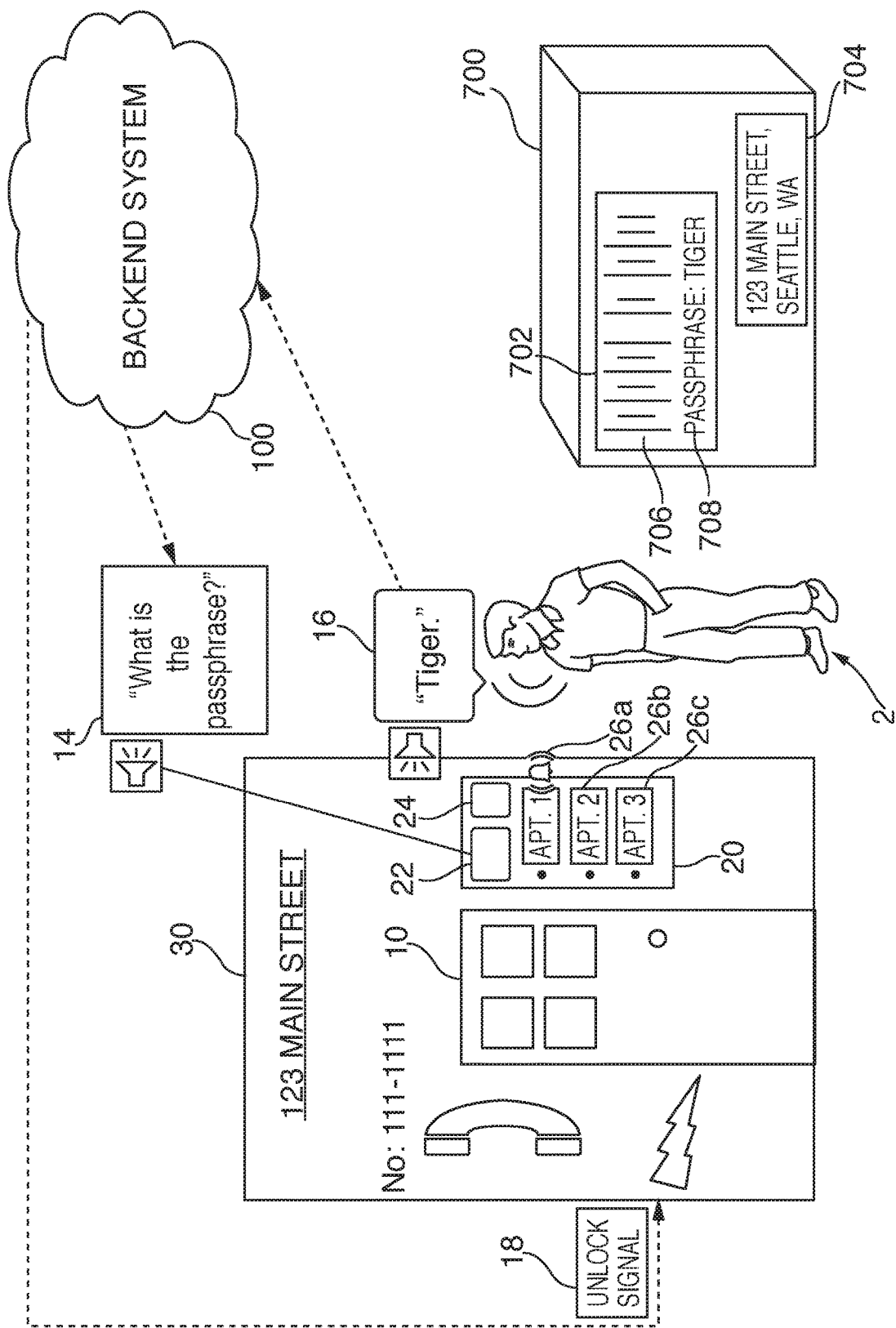
FIG. 7 is an illustrative diagram of a system for using a barcode passphrase to provide access to a residence or other secured area, in accordance with various embodiments.

FIG. 7 is an illustrative diagram of a system for using a barcode passphrase to provide access to a residence or other secured area, in accordance with various embodiments. In FIG. 7, individual 2 may provide a specific passphrase to an access point, such as call box 20, based on a code (e.g., barcode) provided on a package 700. In some embodiments, when a user orders an item online, it will be delivered to the user at their residence via a delivery service. The user may be provided with an option that will enable the delivery service to deliver the item to a front desk or concierge of the residence, or directly to their apartment. This particular option will allow the user to set a specific passphrase to be used to allow the delivery service access to their residence.

In some embodiments, package 700, for example, may include a shipping label 702, which is affixed to an exterior surface of package 700. Also affixed to an exterior surface of package 700 may be a mailing label 704. Mailing label 704 may include an address of the residence (e.g., residence 30) where package 700 is intended to go. For example, mailing label 704 may include the address, "123 Main Street, Seattle, Wash.," which corresponds to an address of residence 30. Persons of ordinary skill in the art will recognize that although package 700 includes both shipping label 702 and mailing label 704, in some embodiments only a single label including features of both shipping label 702 and mailing label 704 may be used, and the aforementioned is merely illustrative.

Shipping label 702 may include a barcode 706 as well as an alphanumeric passphrase 708 corresponding to barcode 706. Barcode 706 may enable the delivery service to track package 700 using any suitable barcode reading device (e.g., a QR reader). For example, when package 700 leaves a shipping facility, the delivery service may scan bar code 706 on package 700 to track that package 700 has left the facility. Then, when package 700 reaches one or more of the various stops along its postal route, bar code 706 may be scanned, and an updated location may of package 700 is logged. This enables the user, as well as the delivery service, to monitor a location of package 700 from the shipping facility to residence 30.

As mentioned above, a user may select an option for package 700 to be delivered such that it includes a preset passphrase to be used by the delivery service that enables individual 2 (e.g., a delivery service employee) to enter residence 30 to deliver package 700. The user may provide the specific passphrase to be used by the delivery service (e.g., "Tiger"), or the passphrase may be set by the delivery service or company that the item is being obtained from. In some embodiments, the user may also define a time period for when the passphrase to be used for allowing individual 2 to enter residence 30 to deliver package 700 is valid. For example, the user may only be able to receive deliveries between the times of 09:00 and 12:00. In this particular scenario, passphrase 708 included on shipping label 702 may only allow individual 2 to enter residence 30 if spoken in response to the passphrase question included within audio message 14 during the aforementioned times.

When the delivery service (e.g., individual 2) arrives at residence 30, they may press button 26*a* corresponding to the user's apartment (e.g., Apt. 1) on call box 20 to be allowed access to residence 30. In response to pressing button 26*a*, call box 20 may call the user's account on backend system 100, which in turn may provide a passphrase question whose answer is passphrase 708 to call box 20 that will be outputted from speaker(s) 22 thereon. Individual 2 may then speak passphrase 708 into microphone(s) 24 on call box 20. For example, passphrase 708 may be the word, "Tiger," and individual 2 may provide audio message 16 in response to being asked audio message 14 including the passphrase question.

The audio message 16 of the answer may then be provided to backend system 100, which may determine whether or not audio message 16 includes passphrase 708. Backend system 100 may also, in some embodiments, determine whether passphrase 708 for package 700 is spoken within the preset time period for when package 700 is to be delivered. If audio message 16 includes passphrase 708, backend system 100 may provide a communication 18 (e.g., an audible tone) that unlocks door 10 so that individual 2 may enter residence 30 to deliver package 700. In some embodiments, providing the communication 18 to unlock door 10 may be substantially similar as steps 322, 324 of process 300, or steps 614, 616 of process 600, and the previous descriptions may apply.

In some embodiments, backend system 100 may access a delivery service application within skills module 262 to verify that individual 2 is, in fact, a delivery person associated with the delivery service delivering package 700. Upon accessing the delivery service application, backend system may generate an audio message asking individual 2 for their delivery service identification number. Individual 2 may, therefore, provide backend system with the delivery service identification number, which may be cross-checked with the delivery service application to verify the identity of individual 2 as being from the delivery service. For example, instead of using the passphrase question, the delivery person may only have to provide their identification number for validation. In response to providing, to call box 20, the correct identification number, backend system 100 may generate audio signal 18 to allow individual 2 to access residence 30. However, persons of ordinary skill in the art will recognize that this mechanism, for instance, may be used with the aforementioned passphrase delivery option, or instead of the passphrase option, and the aforementioned is merely exemplary.

In some embodiments, a resident of residence 30 may, alternatively, provide individual 2 with a specific passphrase for entering a particular entryway of residence 30. For example, a resident of residence 30 may provide individual 2 with a passphrase for opening a garage door (e.g., garage door 912 of FIG. 9). In this way, individual 2 may directly be able to deliver package 700 to residence 30 without the need to enter residence 30.

In some embodiments, in response to correctly providing passphrase 708, backend system 100 may provide individual 2 with an access code to open a garage door or other entryway of residence 30. For example, in response to correctly providing passphrase 708, backend system 100 may generate an audio message indicating to individual 2 that they are to go to a garage door of residence 30, and speak a specific access code to a lock for the garage door, thereby causing the garage door to open so package 700 may be placed therein. As another example, backend system 100 may, instead, provide instructions to individual 2 on how to gain access to residence 30. For instance, backend system 100 may indicate that a spare key is located underneath a rock next to a back door of residence 30.

In some embodiments, instead of individual 2 delivering package 700, a machine, such as an unmanned aircraft device, may deliver package 700. In this particular scenario, instead of providing passphrase 708 as a spoken word by individual 2, the machine may provide sound data corresponding to passphrase 708 (e.g., a machine generated series of sounds). For example, upon arrival, the machine may access a drop zone location of a secured area including an access point. Upon detecting the arrival of the machine, the access point (e.g., call box 20) the machine may provide the series of machine generated sounds. The series of machine generated sounds may then be analyzed to determine whether that particular machine is authorized to deliver package 700 to residence 30. For example, upon departure from the shipping facility, a predefined series of machine generated sounds associated with package 700 may be generated and stored on backend system 100 within a user profile. When the machine arrives at the secured area's access point, the machine provides the series of machine generated sounds to signify that it is dropping off the correct package 700 at the correct drop zone location. Thus, if the series of machine generated sounds is determined to be associated with package 700 that is intended to be dropped off, the drop zone location's secured area may receive package 700 from the machine.

In some embodiments, residence 30 may include a receptacle (e.g., a safe) capable of receiving package 700 in response to passphrase 708 being provided to a microphone located on, or in communication with, the receptacle. The receptacle may, for instance, be installed or placed proximate door 10, or at any other location proximate residence 30 such that individual 2 delivering package 700 may safely drop-off package 700 for a resident of residence 700. In some embodiments, individual 2 may provide passphrase 708 to the receptacle in response to audio message 14. For example, the receptacle may, itself, include microphone 24 and communications circuitry (e.g., communications circuitry 206) such that the receptacle is capable of receiving audio message 16 include passphrase 708, and communicating audio message 16 to backend system 100.

Figure 8:
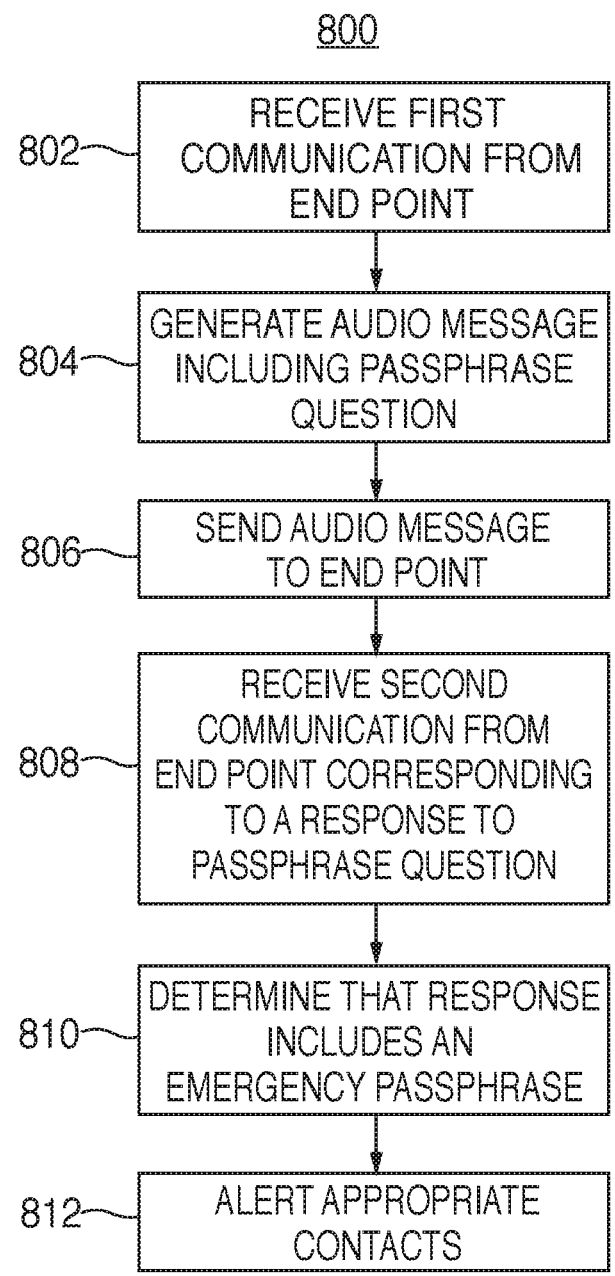
FIG. 8 is an illustrative flowchart of a process for determining that an individual being asked a passphrase question is in potential danger based on an answer to the passphrase question, in accordance with various embodiments.

FIG. 8 is an illustrative flowchart of a process for determining that an individual being asked a passphrase question is in potential danger based on an answer to the passphrase question, in accordance with various embodiments. Process 800 may begin at step 802, where a first communication from an end point (e.g., an access point of a secured location) is received. At step 804, an audio message including a passphrase question whose answer is a passphrase or other sound data for allowing access at the end point is generated. At step 806, the audio message is sent to the end point from, for example, backend system 100. In some embodiments, steps 802, 804, and 806 of process 800 may be substantially similar to steps 602 and 604 of process 600 and/or steps 302-316 of process 300, and the previous descriptions may apply.

At step 808, a second communication from the end point may be received, where the second communication includes a response to the passphrase question. For example, the second communication may be an audio message of an answer to the passphrase question. In some embodiments, a user may set a specific word or phrase as being the answer to the passphrase question generated at step 804. For example, the passphrase may be the word, "Tiger," and the passphrase question may be, "What is the passphrase?" In some embodiments, additional answers to the passphrase question may be provided, where each answer has a different action associated with it. For example, the passphrase, "Tiger" may enable access to residence 30 by providing unlock signal 18 to call box 20. As another example, an additional passphrase, such as the word, "Lion," may also enable access to the secured area and may also signify that the individual saying the additional passphrase is in danger.

This may be referred to as an emergency passphrase. An emergency passphrase may be any particular word or phrase that signifies to backend system 100 that the individual who provided the response to the passphrase question is in danger.

At step 810, a determination may be made that the response to the passphrase question of step 804 is the emergency passphrase. Continuing the example above, audio message 16 may instead include the word, "Lion," as opposed to the non-emergency passphrase, "Tiger." In this scenario, an appropriate contact for emergency situations may be contacted at step 812. For example, backend system 100 may notify the police or any other emergency service that someone at the location of the endpoint is in danger based on the provided emergency passphrase. In some embodiments, the emergency passphrase may act as a silent alarm in that the emergency services may be alerted, but access to the residence may also be provided. This may enable the individual who said the emergency passphrase to not be notified that emergency services have been provided, as doing say may increase the danger of the situation. However, in some embodiments, the fact that one or more appropriate contacts for the emergency passphrase being spoken may be indicated to the individual by an additional audio message provided by backend system 100.

Figure 9:
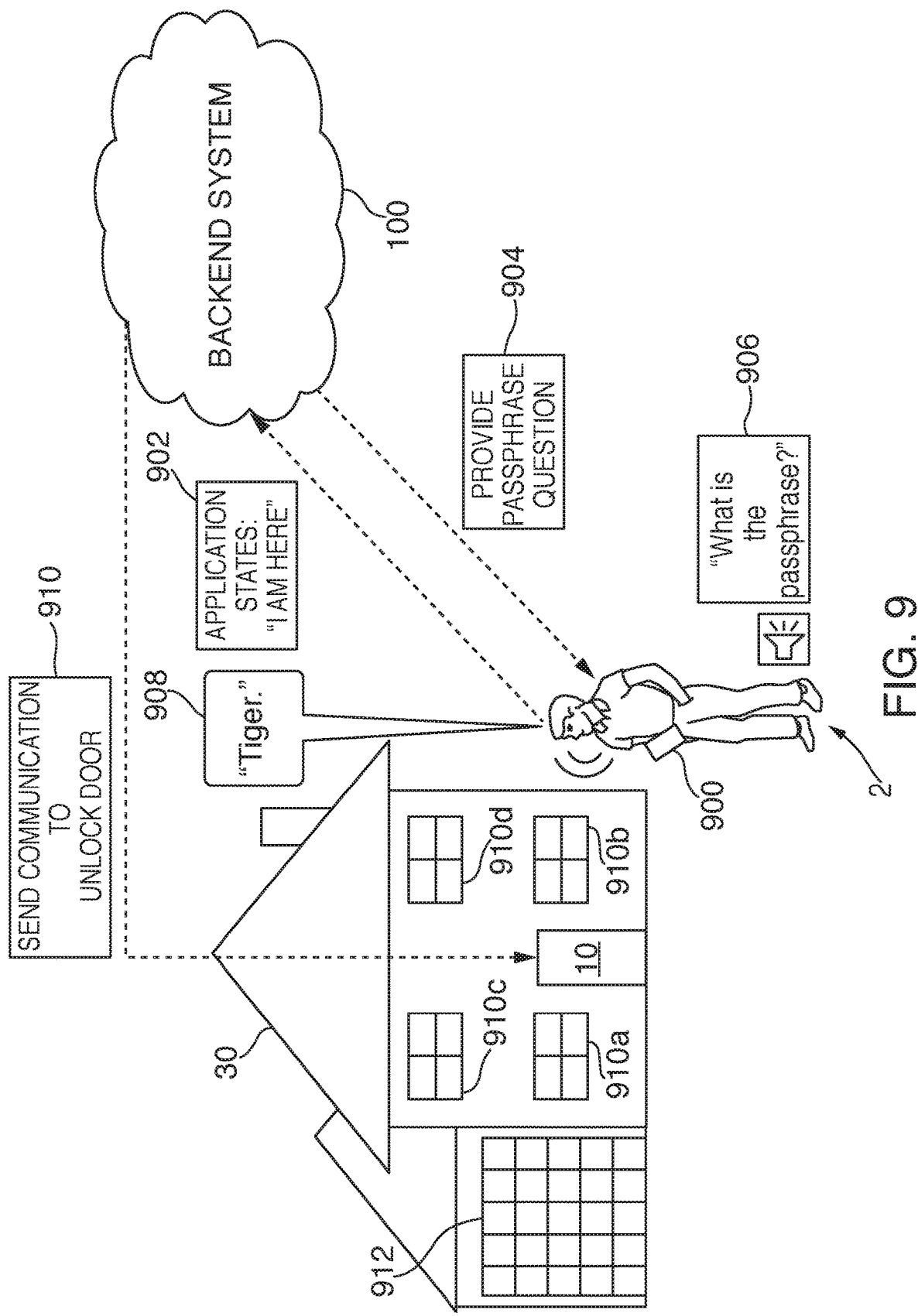
FIG. 9 is an illustrative diagram of a system for providing access to a residence or other secured area using an individual's user device, in accordance with various embodiments.

FIG. 9 is an illustrative diagram of a system for providing access to a residence or other secured area using an individual's user device, in accordance with various embodiments. In some embodiments, residence 30, as seen in FIG. 9, may correspond to a house or building that does not include call box 20. In this particular scenario, individual 2 may seek access to residence 30 and may be able to do so via their mobile device 900. Mobile device 900, in some embodiments may be substantially similar to electronic device 200, and the previous description may apply.

In one exemplary non-limiting embodiment, individual 2 may, upon arriving at residence 30, access an application on mobile device 900 that informs a resident of residence 30 that they have arrived. For example, individual 2 may press a button on the application that states, "I am here." The application on mobile device 900 may then communicate that notification 902 to the resident's user account on user accounts module 268. Notification 902 may, in some embodiments, be analogous to individual 2 pressing one of buttons 26a-c on call box 20 of FIG. 1. In some embodiments, instead of pressing a button that indicates that individual 2 has arrived at residence 30, individual 2 may alternatively send an SMS message or text message to an assigned telephone number for the resident's user account on backend system 100. For example, individual 2 may "text" the message, "I am here," to the assigned telephone number of the resident's user account on backend system 100. In some embodiments, mobile device 900 itself may send the notification message to the assigned telephone number for the resident's user account on backend system 100. For example, using geo-positioning functionality resident on mobile device 900, when mobile device 900 determines that it is in fact proximate to residence 30, mobile device 900 may send the "I am here" notification, or any other notification, to the resident's user account on backend system 100 to indicate that individual 2 has arrived. As another example, in response to detecting a Wi-Fi network of residence 30, mobile device 900 may determine that it is proximate residence 30 and may therefore indicate to the resident's user account on backend system 100 that individual 2 has arrived at residence 30.

After notification 902 is provided to backend system 100, the resident's user account on backend system 100 having an assigned phone number (e.g., "222-2222"), may call mobile device 900 using any one of the aforementioned communications protocols. Upon accepting the incoming communication from backend system 100, backend system 100 may provide generated audio message 906 including a passphrase question 904, such as "What is the passphrase?" Audio message 906 may then be played through one or more speakers located on mobile device 900. Individual 2 may respond to passphrase question 904 with an audio message 908 including an answer to passphrase question 904, such as the word, "Tiger." Audio message 908 may then be communicated to backend system 100, which may determine whether or not the answer within audio message 908 includes the passphrase. For example, the resident may set a passphrase for their user account. Upon receiving audio message 908, backend system 100 may determine whether audio message 908, which is the response to question 904, includes that passphrase.

Alternatively, the resident's user account on backend system 100 having the assigned telephone number may text mobile device 900 with a text massage stating, "What is the passphrase?" In response, individual 2 may respond back with another text message stating, "Tiger." The response text message may then be communicated to backend system 100, in order for backend system 100 to determine whether or not the text message includes the passphrase. In some embodiments, use of text messages may be used with, or instead, of any of audio messages 904 or 908. For example, backend system 100 may provide audio message 906 to mobile device 900 and, in response, individual 2 may text a message saying a response (e.g., "Tiger") to backend system 100 using mobile device 900.

If audio message 908, or a text message that states the same context, indeed includes the correct passphrase (e.g., "Tiger"), backend system 100 may provide a communication 910 that instructs one or more access points for residence 30 to become unlocked. For example, communication 910 may cause door 10 of residence 30 to become unlocked. However, in other embodiments, communication 910 may alternatively, or additionally, cause windows 910a-d or garage door 912 to become unlocked, thereby enabling individual 2 to enter residence 30.

In some embodiments, one or more locks or access points for residence 30 may be in communication with backend system 100. For example, a lock for any of windows 910a-d or door 10 of residence 30 may be a Bluetooth® or Wi-Fi (e.g., 802.11 protocol) lock that communicates with a base receiver or other device, which in turn may be in communication with backend system 100. In response to determining that the correct passphrase has been provided, backend system 100 may send communication 910 to the base receiver for a lock for windows 910a-d and/or door 10. Thus, communication 910 may cause those locks to unlock their respective access point. In another embodiment, communication 910 may cause garage door 912 to open in response to the correct passphrase being provided. For example, communication 910 may be received by a receiver on a motor of garage door 912. Communication 910 may instruct the motor for garage door 912 to open garage door 912, thereby enabling individual 2 to access the garage for residence 30.

In some embodiments, each access point (e.g., door 10, windows 910a-d, garage door 912, a backdoor, a side door, etc.) of residence 30 may have a separate passphrase associated with it that, when spoken by individual 2 in response to passphrase question 904, causes that access point to become unlocked. As described in greater detail below with regard to FIG. 10, these passphrases may be programmed by a resident of residence 30 within the resident's user account. This may enable certain individuals to access different portions of residence 30. For example, a child living at residence 30 may use a specific passphrase for opening a back door in order to be able to enter residence 30 if they have forgotten their key. As another example, a delivery person may be provided with a passphrase that causes garage door 912 to open, thereby allowing the delivery person to leave a package (e.g., package 700) at residence 30.

Furthermore, in some embodiments, instead of individual 2 pressing a button on an application resident on mobile device 900, which states "I am here," one or more proximity devices or wireless communication scanning devices may determine that mobile device 900 is within range of residence 30. For example, mobile device 900 may continually search for Wi-Fi networks with which to connect to. If residence 30 has a Wi-Fi network, that network may determine that a new device (e.g., mobile device 900), is within range of its signal, and therefore may determine that mobile device 900 is nearby residence 30. In this particular scenario, if individual 2 presses a doorbell, or calls a specific number for residence 30 (e.g., "222-2222"), the phone number assigned to the resident's user profile on backend system 100 may be called, and passphrase question 904 may be provided to mobile device 900 in order to allow individual 2 access to residence 30.

Figure 10:
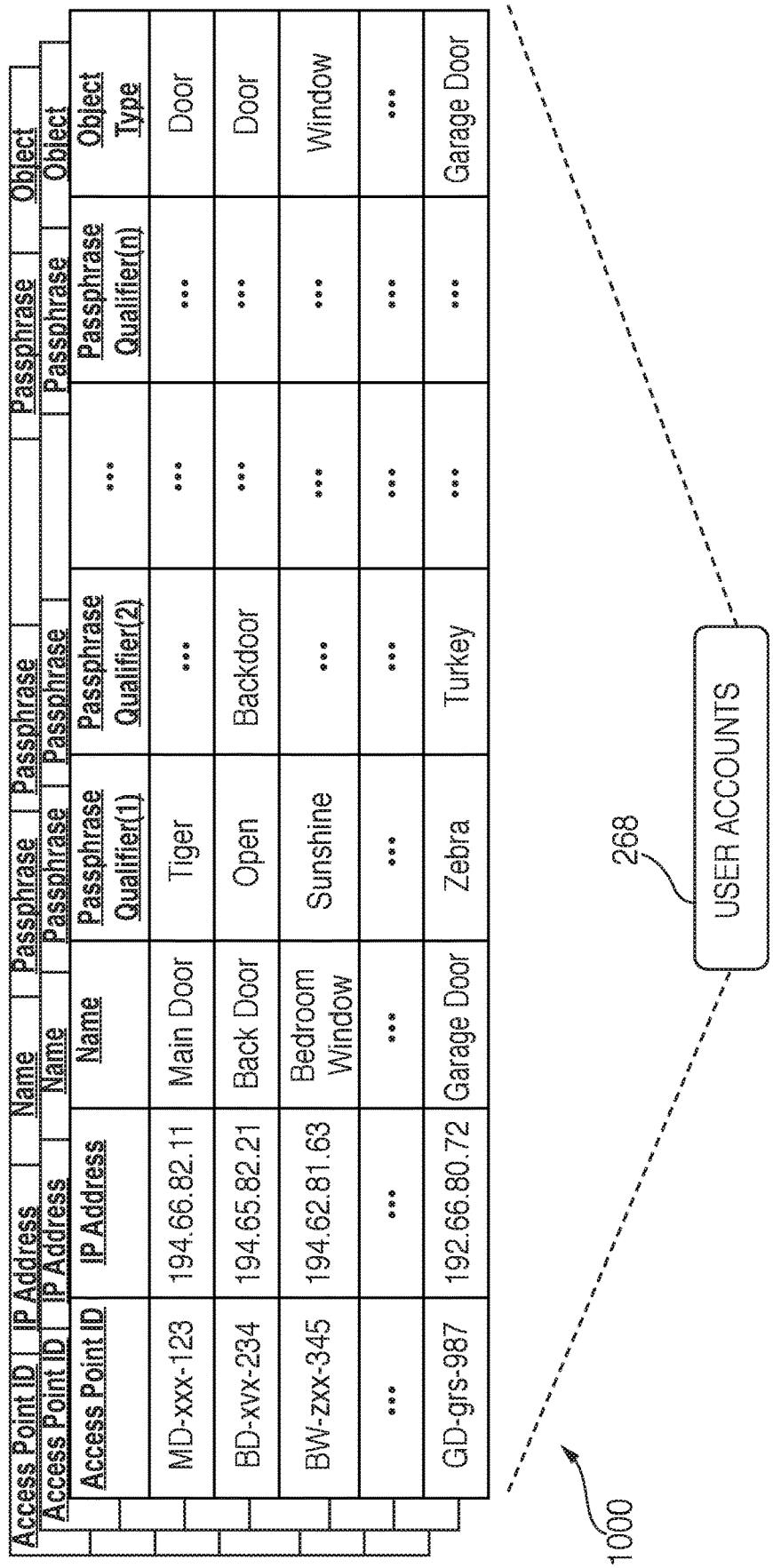
FIG. 10 is an illustrative diagram of a table of passphrase qualifiers for various access points of a residence or other secured area, in accordance with various embodiments.

FIG. 10 is an illustrative diagram of a table of passphrase qualifiers for various access points of a residence or other secured area, in accordance with various embodiments. As mentioned above with reference to FIG. 9, different access points within residence 30 may be unlocked or opened in response to a different passphrase being provided to user account module 268 of backend system 100. Table 1000 of FIG. 10, in some embodiments, may correspond to a list of different access points within residence 30, and the various passphrases that, when provided in response to a passphrase question, enable that access point to be unlocked or opened. Table 1000, in the exemplary, non-limiting embodiment, may be stored within user account module 268, and may be programmed and/or access by a user having a user account stored within user account module 268 on backend system 100.

Each access point may have various pieces of information stored within table 1000 for that access point including, but not limited to, an access point identification number, an IP address for that access point (or a receiver coupled to that access point), a name of the access point, one or more passphrase qualifiers (1)-(n) for the access point, and a type of object that the access point corresponds to. The IP address for each access point may correspond to an internet address for that particular access point. For example, each access point in residence 30 may have a Wi-Fi lock coupled thereto. When a correct passphrase is determined to have been received by backend system 100, backend system 100 may provide communication 910 to that particular access point at their corresponding IP address. The access point may then unlock the corresponding access point after receiving communication 910.

The passphrase qualifiers may, for example, correspond to one or more words, or a series of words, that, when spoken within audio message 906, indicate to backend system 100 which access point a user is attempting to gain access to residence 30 through. For example, if individual 2 responds with answer 908 saying, "Tiger," then table 1000 may indicate to backend system 100 that individual 2 is attempting to access residence 30 via the main door (e.g., door 10). As another example, if individual 2 responds with answer 908 saying, "Zebra" or "Turkey," then table 1000 may indicate to backend system 100 that individual 2 is attempting to access residence 30 via garage door 912. Although some access points include more than one passphrase qualifier, persons of ordinary skill in the art will recognize that this is not a requirement, and any number of passphrase qualifiers may be used for any access point.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A computer-implemented method for identifying and indicating user presence comprising:
    detecting a user input corresponding to a first device at a first location;
    determining first audio data corresponding to a message;
    causing audio corresponding to the first audio data to be output at the first location;
    receiving second audio data responsive to the audio;
    performing speech processing on the second audio data to determine speech processing results;
    determining, based at least in part on the speech processing results, identifying data corresponding to a user at the first location;
    determining, based at least in part on the identifying data, descriptive data corresponding to the user;
    generating, based at least in part on the descriptive data and the second audio data, communication data; and
    sending the communication data to a second device.

2. The computer-implemented method of claim 1, wherein:
    detecting the user input corresponding to the first location comprises detecting a physical interaction with the first device; and
    causing audio corresponding to the first audio data to be output at the first location comprises sending the first audio data to the first device.

3. The computer-implemented method of claim 1, further comprising:
    determining profile data associated with the first location; and
    identifying the second device using the profile data.

4. The computer-implemented method of claim 1, further comprising:
    using the identifying data to determine text data corresponding to the message; and
    performing text-to-speech processing on the text data to determine the first audio data.

5. The computer-implemented method of claim 1, further comprising:
using the descriptive data to determine text data; and
performing text-to-speech processing on the text data to determine third audio data,
wherein the communication data comprises the third audio data, and
wherein the third audio data identifies the user.

6. The computer-implemented method of claim 1, further comprising:
detecting a third device at the first location; and
determining the identifying data using the third device.

7. The computer-implemented method of claim 1, further comprising:
receiving, from the second device, second communication data; and
in response to the second communication data, unlocking a third device at the first location.

8. The computer-implemented method of claim 1, further comprising:
determining a state of the second device; and
determining the first audio data based at least in part on the state of the second device.

9. A system for identifying and indicating user presence, the system comprising:
at least one processor;
at least one memory comprising instructions that, when executed by the at least one processor, cause the system to:
detect a user input corresponding to a first device at a first location;
determine stored data corresponding to a first time associated with the user input;
determine, based at least in part on the stored data, first audio data corresponding to a message;
cause audio corresponding to the first audio data to be output at the first location;
receive first input data responsive to the audio;
perform speech processing on the first input data to determine speech processing results;
determine, based at least in part on the speech processing results, identifying data corresponding to a user at the first location; and
generate, based at least in part on the identifying data and the first input data, communication data; and
send the communication data to a second device.

10. The system of claim 9, wherein:
the instructions that cause the system to detect the user input corresponding to the first location comprise instructions that, when executed by the at least one processor, further cause the system to detect a physical interaction with the first device; and
the instructions that cause the system to cause audio corresponding to the first audio data to be output at the first location comprise instructions that, when executed by the at least one processor, further cause the system to send the first audio data to the first device.

11. The system of claim 9, wherein the at least one memory further comprises instructions that, when executed by the at least one processor, further cause the system to:
receive second audio data corresponding to speech captured by a microphone at the first location; and
perform speech processing on the second audio data to determine speech processing results,
wherein the instructions that cause the system to determine the identifying data cause the system to determine the identifying data based at least in part on the speech processing results.

12. The system of claim 11, wherein the at least one memory further comprises instructions that, when executed by the at least one processor, further cause the system to:
process the speech processing results to determine descriptive data corresponding to the user,
wherein the communication data comprises the descriptive data.

13. The system of claim 9, wherein the at least one memory further comprises instructions that, when executed by the at least one processor, further cause the system to:
determine profile data associated with the first location; and
identify the second device using the profile data.

14. The system of claim 9, wherein the at least one memory further comprises instructions that, when executed by the at least one processor, further cause the system to:
use the identifying data to determine text data corresponding to the message; and
perform text-to-speech processing on the text data to determine the first audio data.

15. The system of claim 9, wherein the at least one memory further comprises instructions that, when executed by the at least one processor, further cause the system to:
use the identifying data to determine text data; and
perform text-to-speech processing on the text data to determine second audio data,
wherein the communication data comprises the second audio data.

16. The system of claim 9, wherein the at least one memory further comprises instructions that, when executed by the at least one processor, further cause the system to:
detect a third device at the first location; and
determine the identifying data using the third device.

17. The system of claim 9, wherein the at least one memory further comprises instructions that, when executed by the at least one processor, further cause the system to:
receive, from the second device, second communication data; and
in response to the second communication data, unlock a third device at the first location.

18. The system of claim 9, wherein the at least one memory further comprises instructions that, when executed by the at least one processor, further cause the system to:
determine a state of the second device; and
determine the first audio data based at least in part on the state of the second device.

* * * * *